United States Patent Office 2,762,838
Patented Sept. 11, 1956

2,762,838

MANUFACTURE OF MONOHYDROXY AROMATIC COMPOUNDS FROM AROMATIC CARBOXYLIC ACIDS

William G. Toland, Jr., San Rafael, Calif., assignor to California Research Corporation, San Francisco, Calif., a corporation of Delaware No Drawing. Application March 16, 1951,
Serial No. 216,084

19 Claims. (Cl. 260—476)

This invention relates to the manufacture of monohydroxy aromatic compounds and, more particularly, to a process for converting aromatic monocarboxylic acids to monohydric phenols.

The growing scarcity of benzene renders ever more desirable the discovery of new sources of raw materials suitable for the manufacture of monohydroxy aromatic compounds and, in particular, of monohydroxy benzene, i. e., phenol.

I have found that aromatic monocarboxylic acids such as benzoic acid, tertiary butyl benzoic acids, toluic acids, i. e., isomeric meta-, para-, and ortho-methyl benzoic acids, and naphthoic acids can be converted to phenolic esters, e. g., phenyl benzoate, by a liquid phase oxidation in the presence of copper compounds, and that these phenolic esters can be then hydrolyzed to the corresponding phenols or cresols in accordance with the following equations:

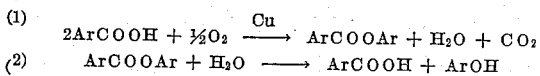

In accordance with the invention phenolic esters of aromatic monocarboxylic acids convertible to phenols may be obtained by heating the aromatic acid in the liquid phase, either in melted state or in solution in a suitable solvent, at a temperature ranging from about 400 to about 600° F. in the presence of a copper material associated with oxygen. The copper material may be associated with oxygen by being chemically combined therewith as in a copper oxide, e. g., CuO or Cu$_2$O, or in an oxygen-containing copper salt, e. g., Cu(CH$_3$COO)$_2$, CuCO$_3$, CuSO$_4$, Cu(C$_6$H$_5$COO)$_2$; or oxygen may be bubbled through the liquid-phase reaction mixture of the aromatic monocarboxylic acid and a copper material from the group which includes not only the copper oxides and oxygen-bearing copper salts, but other copper salts as well and the metallic copper itself. In lieu of pure oxygen, air or any other gas containing free oxygen may be employed. Where the oxidation of an aromatic monocarboxylic acid is carried out at the expense of oxygen chemically combined with copper, as in a carbonate, an organic salt or an oxide, the quantity of copper material required for the reaction may be varied within wide limits from 1 to 100% by weight and even higher, based on the aromatic monocarboxylic acid being oxidized, depending on the degree of conversion desired. In most instances amounts from about 5 to about 50% by weight, based on the acid to be oxidized, are found to be satisfactory. Otherwise, when pure oxygen, air, or any other free oxygen-containing gas is employed to effect oxidation, the copper material, e. g., CuO, in amounts ranging from about 0.1 to about 10% by weight of the acid subjected to oxidation, is found to be sufficient to catalyze the reaction. The use of cupric oxide is usually preferred to that of cuprous oxide, because it secures a much faster oxidation of the aromatic acid and higher yields of phenolic esters convertible to phenols.

The solvents which may be employed to dissolve the aromatic monocarboxylic acids to be converted to phenolic esters in accordance with the invention comprise very esters to be formed in such a conversion, e. g., phenyl benzoate; various oxidation-stable hydrocarbons, e. g., biphenyl; various perhalo organic compounds, e. g., hexachlorobutadiene, as well as water, provided sufficient pressure is applied to maintain the aromatic acids in an aqueous solution at the reaction temperatures from about 400 to about 600° F.

Once the phenolic esters have been formed by the aforementioned reaction of copper-catalyzed oxidation of aromatic monocarboxylic acids, they can be split to give the initial acid and a phenol by the method of saponification with caustic soda or by acid hydrolysis.

The aromatic monocarboxylic acids which may be catalytically converted to phenolic esters in accordance with my invention may contain either an aryl or a naphthyl nucleus as exemplified by benzoic acid, tertiary butyl benzoic acids, toluic acids and naphthoic acids. Aromatic monocarboxylic acids containing biphenyl or bibenzyl, or stilbene nuclei also can be converted to monohydroxy aromatic compounds in accordance with the process of my invention. Those acids containing alkyl groups or other hydrocarbon substituents attached to the aromatic nucleus give somewhat lower yields than the non-substituted aromatic acids, benzoic acid appearing to furnish the best yield as will be seen from the illustrative examples hereinafter.

A characteristic feature of the oxidation reaction in my process, when employing alkyl-substituted, or other substituted, aromatic monocarboxylic acids, is the concurrent rearrangement of the aromatic acid molecule. Hydrocarbon substituents present in the ortho position shift to the meta position on the benzene ring, those present in the meta position rearrange themselves to the ortho and para positions, and those in the para position come to occupy the meta position on the aryl nucleus of the resulting phenolic ester and the corresponding phenol. Thus meta-toluic acid, when oxidized in the presence of a copper compound under the conditions of my invention, yields a 50 to 50 mixture of ortho- and para-cresol, but fails to yield metal-cresol. Similarly, para-tertiary-butyl benzoic acid produces meta-tertiary-butyl phenol, and ortho-toluic acid yields meta-cresol. Because of this capacity of rearrangement, it becomes feasible, e. g., to employ mixtures of ortho- and para-toluic acids for oxidation to meta-tolyl toluates and subsequent conversion to meta-cresol.

The reaction of oxidation is followed by observing the rate of oxygen absorption by the liquid phase reaction mixture, or by observing the formation of carbon dioxide and water. Either procedure permits of determining the instant at which the desired degree of conversion is reached. The following illustrative examples will aid in understanding the operating procedure is preparing monohydroxy aromatic compounds in accordance with my invention and will provide representative data of the many possible conversions of aromatic monocarboxylic acids into phenolic esters and corresponding phenols.

*Example 1.*—This example illustrates copper-catalyzed oxidation of benzoic acid to phenyl benzoate and subsequent conversion of this latter to phenol which is obtained in a yield of 90.7% by weight of the acid by theory.

A 200 cc. glass vessel provided with agitating paddles and a water separator, a reflux condenser, and a vent to a caustic scrubber was charged with 122 g. of benzoic acid and 1.2 g. of a copper oxide (CuO). The contents were heated electrically to 475° F. The agitating paddles were started up and oxygen was introduced at the base of the vessel at the rate of 190 cc. per minute for a period of 40 minutes. A sample of the tail gases leaving the vessel, taken after 30 minutes, indicated the presence of 21.4% of $CO_2$. The reaction was stopped in 40 minutes, when the tail gases upon sampling showed the presence of 50.7% of $CO_2$. Water and some benzoic acid collected in the water separator. The resulting product mixture was digested with 60 g. of sodium hydroxide, dissolved in 500 cc. of water and 50 cc. of ethanol over night in order to complete the saponification of phenyl benzoate. Thereafter, ethanol was stripped off, and the remaining aqueous solution was filtered to remove copper and then acidified with hydrochloric acid to a pH=6.0 in order to facilitate the separation of phenol without separating benzoic acid. This phenol was removed by ether extraction and upon evaporation of the ether, the residue was distilled, yielding 11.1 g. of phenol of 82% purity, the heart cut fraction (which boiled between 355–361° F.), containing 6.1 g. of phenol of 95% purity. The aqueous solution of sodium benzoate was stripped to remove ether and acidified with hydrochloric acid to a pH=2.0 in order to effect the precipitation of benzoic acid. Upon filtering, washing and drying of this latter, a total of 109 g. of benzoic acid was obtained.

*Example 2.*—This example illustrates liquid-phase oxidation of benzoic acid with a copper oxide (CuO) as an oxidizing agent.

In this case a 200 cc. round bottomed flask was fitted with a water separator, a reflux condenser and a measuring burette for carbon monoxide gas, received the charge of 61 g. of benzoic acid and 20 g. of cupric oxide as the oxidant, 15 cc. of xylene being added to form an azeotrope with the water of reaction. The flask was electrically heated to 500–565° F. for 5.5 hours. At the end of this heating 4.0 cc. of water and 6640 cc. of carbon dioxide were collected. The final product mixture was cooled and diluted with xylene to facilitate handling. On filtering 16.1 g. of copper was recovered, and the filtrate was distilled to remove xylene at atmospheric pressure and then further distilled at a pressure of 20 mm. of mercury to give 31 g. of phenyl benzoate which had a saponification equivalent of 183.2 (theoretical value 198.0). After 10 g. of this phenyl benzoate, 8 g. of sodium hydroxide, 72 cc. of water and 25 cc. of 95% ethanol were charged into a stripping still of 150 cc. capacity and refluxed 2 hours, ethanol was stripped off and the product chilled and saturated with $CO_2$ to liberate phenol which was subsequently steam-stripped. The analysis of the condensate by titration (bromide-bromate) indicated the presence of 3.8 g. of phenol. This amount corresponded to 40.8% by weight yield of phenol (based on the acid consumed), the conversion of benzoic acid to phenyl benzoate being equal to 61.4%.

*Example 3.*—This example was carried out in the equipment and under the conditions similar to those in Example 1. However, the copper oxide (as cupric oxide) was present in a larger amount (6.4 g.) and air instead of oxygen was used for oxidation, being admitted into the reactor at the rate of 250 cc. per minute. The mixture was heated to 485° F. for 3 hours. The oxidation gave 63.5 mol per cent conversion to phenyl benzoate, the yield of which was found to be 41.5% by weight, or 51.4% of the theory, based on the benzoic acid.

*Example 4.*—This example is illustrative of the characteristic rearrangement of hydrocarbon substituents in aromatic monocarboxylic acids during their oxidation and conversion to phenols in accordance with my invention.

The acid subjected to oxidation was para-tertiary-butyl benzoic acid in an amount of 144 g. Cupric oxide was used again as a catalyst in an amount of 1.6 g., air being employed as the oxidizing agent, and fed at the rate of 250 cc. per minute. The temperature of reaction was maintained at 500° F. for 1¾ hours. The final product was meta-tertiary-butyl phenol in an amount of 30.2 g., which corresponded to a conversion of the acid equal to 37.5 mol per cent and to a yield of meta-tertiary-butyl phenol of 56.5% by weight.

*Example 5.*—This example, similar to Example 4, illustrates the occurrence of rearrangement during the oxidation of alkyl-substituted aromatic monocarboxylic acids.

In Example 5 para-tertiary-butyl benzoic acid was oxidized under the conditions and using the equipment of Example 2. The amounts of the acid and of the copper oxide (CuO) employed as an oxidant, were 82.0 g. and 20.0 g. respectively. Temperature of reaction was maintained at 550° F. for 8 hours. The ultimate product, upon hydrolysis of the ester, was found to be meta-tertiary-butyl phenol, the ester having been obtained in a yield of 50.5% by weight (based on the acid consumed) which corresponded to a conversion of the acid equal to 75.5 mol per cent.

*Example 6.*—The purpose of this test run, and of the test runs in the following two Examples 7 and 8, was to confirm the rearrangement of hydrocarbon substituents in toluic acids oxidized in accordance with my invention.

In Example 6 ortho-toluic acid in an amount of 34 g. was oxidized under the same conditions as those employed in Example 1. Cupric oxide (CuO) was present as a catalyst in the amount of 0.4 g., and air for the oxidation was bubbled through at a rate of 200 cc. per minute. The temperature in the reaction flask was maintained between 480 to 545° F. by means of an electric heating coil for a period of time of about 2 hours and 30 minutes. As the final product after saponification, 2.6 g. of meta-cresol was obtained.

*Example 7.*—In this example 68 g. of meta-toluic acid was oxidized by employing an oxide (CuO) as the oxidant in an amount of 20 g., while heating at a temperature which ranged from 500 to 550° C., for 9 hours, in the equipment and under the conditions of Example 2. Upon hydrolysis of the tolyl toluates obtained in a yield of 69.0% by weight, a 50 to 50 mixture of ortho- and para-cresols was recovered.

*Example 8.*—Para-toluic acid in an amount of 68.0 g. was oxidized with a copper oxide (CuO) in an amount of 20 g. for about 16½ hours at a temperature from about 480 to about 560° F. in the same equipment and under the same conditions as in Example 2. The meta-tolyl paratoluate was produced with a conversion of 93.0 mol per cent of the acid and in a yield of 21.1, and was subsequently hydrolyzed to meta-cresol.

The data presented in the aforementioned examples clearly establish the feasibility of preparing phenolic esters and of converting them to phenols and cresols by my process of liquid-phase oxidation of aromatic monocarboxylic acids in the presence of a copper compound either as a catalyst or as an oxidant. Consequently, this route for converting aromatic monocarboxylic acids an monohydroxy aromatic compounds appears highly attractive for the purposes of chemical industry. In particular the high yields of phenols secured in the conversion of benzoic acid in accordance with my invention, point to the possibility of employing this new route for the production of phenol, so important as the intermediate material for the manufacture of surface-active agents, additives for lubricating oils, disinfectants, and other valuable products.

It is to be understood that my invention is in no way limited by the specific examples given hereinbefore and that many modifications and variations in conformity with the spirit of the invention may be made without departing from the scope of my inventive contribution as defined in the following claims.

I claim:

1. A process which comprises passing a free oxygen-containing gas through a liquid-phase aromatic hydrocarbon having less than 13 nuclear carbon atoms in its molecular structure and having one carboxyl group attached to its aromatic nucleus, at a temperature in the range from about 400° F. to about 600° F. and in the presence of a copper catalyst, to convert said monocarboxy-substituted aromatic hydrocarbon to a phenolic ester.

2. A process for producing compounds having the formula ArCOOAr wherein Ar is an aromatic hydrocarbon radical, which comprises: (1) heating an aromatic hydrocarbon having less than 13 nuclear carbon atoms in its molecular structure, and having one carboxyl group attached to an aromatic nucleus, in the liquid phase to a temperature from about 400° F. to about 600° F.; and (2) passing a free oxygen-containing gas through the hot liquid monocarboxy-substituted hydrocarbon in the presence of from 0.1 to 10% by weight, based on said monocarboxy-substituted hydrocarbon, of a copper catalyst to produce phenolic esters of said monocarboxy-substituted hydrocarbon, these esters having said formula ArCOOAr.

3. A process as defined in claim 2 wherein said aromatic hydrocarbon having a carboxyl substituent attached to its nucleus is an ortho-monoalkyl benzoic acid.

4. A process as defined in claim 2 wherein said aromatic hydrocarbon having a carboxyl substituent attached to its nucleus is a metamonoalkyl-substituted benzoic acid having from 1 to 4 carbon atoms in the alkyl chain.

5. A process as defined in claim 2 wherein said aromatic hydrocarbon having a carboxyl substituent attached to its nucleus is a para-monoalkyl benzoic acid.

6. A process which comprises passing a free oxygen-containing gas through a liquid-phase aromatic hydrocarbon having less than 13 nuclear carbon atoms in its molecular structure and having one carboxyl group attached to its aromatic nucleus, at a temperature in the range from about 400° F. to about 600° F. and in the presence of a copper catalyst, to convert said monocarboxy-substituted aromatic hydrocarbon to a phenolic ester; and hydrolyzing this phenolic ester to produce a phenol and the initial monocarboxy-substituted aromatic hydrocarbon.

7. A process for producing phenols from aromatic monocarboxylic acids, which comprises oxidizing an aromatic monocarboxylic acid to a phenolic ester thereof by passing a free oxygen-containing gas through said aromatic acid in the liquid phase, at a temperature in the range from about 400° F. to about 600° F. and in the presence of about 0.1 to about 10.0% by weight, based on said aromatic acid, of a copper catalyst; and hydrolyzing said phenolic ester to produce a phenol and the initial aromatic monocarboxylic acid.

8. A process for producing compounds of the formula ArOH, wherein Ar is an aromatic hydrocarbon radical, which comprises passing a free oxygen-containing gas through a liquid-phase acid of the formula ArCOOH, wherein Ar is an aromatic hydrocarbon radical at a temperature from about 400° F. to about 600° F. in the presence of a copper catalyst; hydrolyzing the reaction product; and recovering a monohydroxy-substituted compound of the formula ArOH from the hydrolyzate.

9. A process for producing monohydroxy aromatic compounds which comprises: (1) heating an aromatic hydrocarbon having less than 13 nuclear carbon atoms in its molecular structure, and having one carboxyl group attached to its aromatic nucleus, in the liquid phase to a temperature from about 400° F. to about 600° F.; (2) passing a free oxygen-containing gas through said liquid-phase monocarboxy-substituted hydrocarbon in the presence of from 0.1 to 10% by weight, based on said monocarboxy-substituted hydrocarbon, of a copper catalyst; and (3) hydrolyzing the resulting phenolic ester reaction product.

10. A process as defined in claim 9, in which said monocarboxy-substituted aromatic hydrocarbon furthermore has at least one alkyl group attached to its nucleus.

11. A process as defined in claim 9 wherein said monocarboxy-substituted aromatic hydrocarbon has attached to its nucleus at least one phenyl group.

12. A process as defined in claim 9 wherein said monocarboxy-substituted aromatic hydrocarbon has attached to its nucleus at least one alkyl group containing from 1 to 4 carbon atoms.

13. A process as defined in claim 9 wherein said monocarboxy-substituted aromatic hydrocarbon has attached to its nucleus at least one methyl group.

14. A process as defined in claim 9 wherein said copper catalyst is a copper oxide.

15. A process for producing phenol which comprises heating benzoic acid to a temperature from about 400 to about 600° F.; passing a free oxygen-containing gas through the benzoic acid in the liquid phase in the presence of from 0.1 to 10.0% by weight, based on said benzoic acid, of a copper catalyst to produce phenyl benzoate; and hydrolyzing the resulting phenyl benzoate.

16. A process for producing cresols which comprises: (1) heating a toluene having one carboxyl group attached to its nucleus in the liquid phase to a temperature from about 400° to about 600° F.; (2) passing a free oxygen-containing gas through said liquid-phase monocarboxy-substituted toluene in the presence of from 0.1 to 10.0% by weight, based on said monocarboxy-substituted toluene, of a copper catalyst; and (3) hydrolyzing the resulting tolyl toluate esters.

17. A process for producing cresols which comprises: (1) heating toluene having one carboxyl group attached to its nucleus in the liquid phase to a temperature from about 400° to about 600° F.; (2) passing a free oxygen-containing gas through said liquid-phase monocarboxy-substituted toluene in the presence of from 0.1 to 10.0% by weight, based on said monocarboxy-substituted toluene, of cupric oxide; and (3) hydrolyzing the resulting tolyl toluate esters.

18. The process as defined in claim 8 wherein said acid of the formula ArCOOH is dissolved in water.

19. The process as defined in claim 15 wherein said benzoic acid is dissolved in water.

References Cited in the file of this patent

UNITED STATES PATENTS

| | | |
|---|---|---|
| 2,402,940 | Berry et al. | July 2, 1946 |
| 2,488,472 | Kremmers | Nov. 15, 1949 |

OTHER REFERENCES

Fischer et al.: Chem. Abstr., vol. 17, pg. 2572 (1923).

Zoltan: Magyar Chemiai Folyoirat, vol. 38 (1932) pp. 1–7.

Bamdas et al.: Chem. Abst. 43 124 (1949) (citing Z'hur Obscher Khim. 18, 324–36 (1948).

Beilstein Handbuch, Band 9 (1949) 2nd Sup. pp. 84–85.